US012770575B2

(12) United States Patent
Seo et al.

(10) Patent No.: US 12,770,575 B2
(45) Date of Patent: Oct. 20, 2026

(54) ELECTRONIC DEVICE

(71) Applicant: Samsung Display Co., LTD., Yongin-si (KR)

(72) Inventors: Youngwan Seo, Yongin-si (KR); Junki Jeong, Yongin-si (KR); Junghwan Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/209,389

(22) Filed: May 15, 2025

(65) Prior Publication Data

US 2026/0045222 A1 Feb. 12, 2026

(30) Foreign Application Priority Data

Aug. 12, 2024 (KR) ........................ 10-2024-0107468

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2300/0819* (2013.01); *G09G 2300/0852* (2013.01); *G09G 2300/0861* (2013.01); *G09G 2310/0267* (2013.01); *G09G 2310/0283* (2013.01);
(Continued)

(58) Field of Classification Search
CPC .... G06F 3/0412; G06F 3/044; G06F 3/04883; G09G 3/3225; G09G 3/3258; G09G 3/3266; G09G 2300/0426; G09G 2300/0819; G09G 2300/0852; G09G 2300/0861; G09G 2310/0267; G09G 2310/0283; G09G 2310/0286; G09G 2310/0289; G09G 2310/06; G09G 2310/08; G09G 2330/021; G09G 2354/00;
(Continued)

(56) References Cited

U.S. PATENT DOCUMENTS 11,074,842 B2 7/2021 Park et al.
11,915,656 B2 2/2024 Kim
(Continued)

FOREIGN PATENT DOCUMENTS

CN 118248063 A 6/2024
KR 1020190139481 A 12/2019
(Continued)

*Primary Examiner* — Julie Anne Watko
(74) *Attorney, Agent, or Firm* — CANTOR COLBURN LLP

(57) ABSTRACT

An electronic device includes a stage. The stage includes a node control circuit; a first transistor connected between a first power line and a first output node; a first capacitor connected between a gate electrode of the first transistor and the first output node; a second transistor connected between a first clock line and a second output node; a second capacitor connected between a gate electrode of the second transistor and the second output node; a third transistor connected between a second clock line and a third output node; a third capacitor connected between a gate electrode of the third transistor and the third output node; and a fourth transistor connected between a first node and the gate electrode of the first transistor, and maintained in a turn-on state in response to a first voltage.

20 Claims, 12 Drawing Sheets

(52) U.S. Cl.
CPC ............... *G09G 2310/0286* (2013.01); *G09G 2310/0289* (2013.01); *G09G 2310/06* (2013.01); *G09G 2310/08* (2013.01)

(58) Field of Classification Search
CPC .. H10D 86/441; H10D 86/471; H10D 86/481; H10D 86/60; H10D 59/12; H10K 59/131
See application file for complete search history.

(56) References Cited

U.S. PATENT DOCUMENTS

| | | | | |
|---|---|---|---|---|
| 2023/0113452 | A1 | 4/2023 | Kim et al. | |
| 2023/0206825 | A1 | 6/2023 | Lee | |
| 2024/0078958 | A1* | 3/2024 | No | G11C 19/28 |
| 2024/0212625 | A1 | 6/2024 | Seo et al. | |
| 2025/0104596 | A1* | 3/2025 | Kim | G09G 3/2092 |
| 2025/0342798 | A1* | 11/2025 | Park | G09G 3/32 |

FOREIGN PATENT DOCUMENTS

| | | | |
|---|---|---|---|
| KR | 1020230046918 | A | 4/2023 |
| KR | 1020230051390 | A | 4/2023 |
| KR | 1020230099185 | A | 7/2023 |
| KR | 1020230101507 | A | 7/2023 |
| KR | 1020240102066 | A | 7/2024 |

* cited by examiner

ELECTRONIC DEVICE

This application claims priority to Korean Patent Application No. 10-2024-0107468, filed on Aug. 12, 2024, and all the benefits accruing therefrom under 35 U.S.C. § 119, the content of which in its entirety is herein incorporated by reference.

BACKGROUND

The present disclosure herein relates to an electronic device with reduced power consumption and a decreased width of a non-display area.

Multimedia devices such as televisions, mobile phones, tablet computers, navigation devices, and game consoles include display panels for displaying images. Research is being conducted to reduce the area of the display panel that does not display images (non-display area or bezel area) in response to market demands.

SUMMARY

The present disclosure provides an electronic device with reduced power consumption and a decreased width of a non-display area.

An embodiment of the invention provides an electronic device including: a plurality of pixels; a plurality of scan lines electrically connected to the plurality of pixels; and a stage electrically connected to corresponding scan lines of the plurality of scan lines to receive a first clock signal and a second clock signal, where the stage includes: a node control circuit configured to control a voltage of a first node and a voltage of a second node; a first output circuit including a first transistor, which is connected between a first power line to which a first voltage is provided and a first output node, and a first capacitor, which is connected between a gate electrode of the first transistor and the first output node; a second output circuit including a second transistor, which is connected between a first clock line to which the first clock signal is provided and a second output node, and a second capacitor, which is connected between a gate electrode of the second transistor and the second output node; a third output circuit including a third transistor, which is connected between a second clock line to which the second clock signal is provided and a third output node and a third capacitor, which is connected between a gate electrode of the third transistor and the third output node; and a fourth transistor connected between the first node and the gate electrode of the first transistor, and configured to be maintained in a turn-on state in response to the first voltage.

In an embodiment, the first transistor, the second transistor, and the third transistor may be controlled in response to a voltage of a third node.

In an embodiment, the stage may further include: a fifth transistor, which is connected between the first node and the gate electrode of the second transistor; and a sixth transistor, which is connected between the first node and the gate electrode of the third transistor.

In an embodiment, the fifth transistor and sixth transistor may be maintained in a turn-on state in response to the first voltage.

In an embodiment, the electronic device may further include a third clock line to which a third clock signal is provided and a fourth clock line to which a fourth clock signal is provided, the first clock signal may have a first turn-on period, the second clock signal may haves a second turn-on period, the third clock signal may have a third turn-on period, the fourth clock signal may have a fourth turn-on period, the first turn-on period and the third turn-on period may not overlap each other, and the second turn-on period and the fourth turn-on period may not overlap each other.

In an embodiment, each of the fifth transistor and the sixth transistor may further include a back gate electrode, the back gate electrode of the fifth transistor may be connected to the third clock line, and the back gate electrode of the sixth transistor may be connected to the fourth clock line.

In an embodiment, the stage may further include: a seventh transistor, which is connected between a second power line to which a second voltage having a lower level than the first voltage is provided and the gate electrode of the second transistor; and an eighth transistor, which is connected between the second power line and the gate electrode of the third transistor, and a gate electrode of the seventh transistor and a gate electrode of the eighth transistor may be connected to the third clock line.

In an embodiment, the stage may further include a ninth transistor, which is connected between the first node and a fourth node, one end of the fifth transistor and one end of the sixth transistor may be connected to the fourth node, and a gate electrode of the ninth transistor may be connected to the fourth click line.

In an embodiment, the first output circuit may output a first output signal having a first output turn-on period, the second output circuit may output a second output signal having a second output turn-on period, and the third output circuit may output a third output signal having a third output turn-on period, and each of the second output turn-on period and third output turn-on period may overlap the first output turn-on period.

In an embodiment, the plurality of pixels may include a first pixel and a second pixel spaced apart from the first pixel, and the first output signal may be transferred to the first pixel and the second pixel, the second output signal may be transferred to the first pixel, and the third output signal may be transferred to the second pixel.

In an embodiment, the first transistor, the second transistor, the third transistor, and the fourth transistor may be an N-type transistor.

In an embodiment, the electronic device may further include a second power line to which a second voltage having a lower level than the first voltage is provided, the first output circuit may further include a first pull-down transistor, which is connected between the second power line and the first transistor, the second output circuit may further include a second pull-down transistor, which is connected between the second power line and the second transistor, the third output circuit may further include a third pull-down transistor, which is connected between the second power line and the third transistor, and the first pull-down transistor, the second pull-down transistor, and the third pull-down transistor may be controlled in response to the voltage of the second node.

In an embodiment, the electronic device may further include: a third power line to which a third voltage having a lower level than each of the first voltage and the second voltage are provided; and a carry clock line to which a carry clock signal is provided, and the stage may further include a carry circuit including a first carry transistor and a second carry transistor, which are connected between the carry clock line to which the carry clock signal is provided and the third power line.

In an embodiment of the invention, an electronic device includes: a first pixel; a second pixel spaced apart from the first pixel; a first write scan line electrically connected to the first pixel; a second write scan line electrically connected to the second pixel; a compensation scan line electrically connected to the first pixel and the second pixel; and a stage configured to output a first write scan signal to the first write scan line, output a second write scan signal to the second write scan line, and output a compensation scan signal to the compensation scan line, where the stage includes: a first transistor, which is connected between a first power line to which a first voltage is provided and a first output node; a second transistor, which is connected between a first clock line to which a first clock signal is provided and a second output node; a third transistor, which is connected between a second clock line to which a second clock signal is provided and a third output node; and a fourth transistor connected between a first node and a gate electrode of the first transistor, and configured to be maintained in a turn-on state in response to the first voltage.

In an embodiment, the electronic device may further include a second power line to which a second voltage having a lower level than the first voltage is provided, where the stage may further include: a first pull-down transistor connected between the second power line and the first transistor, a second pull-down transistor connected between the second power line and the second transistor, and a third pull-down transistor connected between the second power line and the third transistor, and the first pull-down transistor, the second pull-down transistor, and the third pull-down transistor may be controlled in response to a voltage of a second node.

In an embodiment, the first transistor, the second transistor, and the third transistor may be controlled in response to a voltage of a third node.

In an embodiment, the stage may further include: a fifth transistor connected between the first node and a gate electrode of the second transistor; and a sixth transistor connected between the first node and a gate electrode of the third transistor, and the fifth transistor and the sixth transistor may be maintained in a turn-on state in response to the first voltage.

In an embodiment, each of the fifth transistor and the sixth transistor may further include a back gate electrode, the back gate electrode of the fifth transistor may be connected to a third clock line, and the back gate electrode of the sixth transistor may be connected to a fourth clock line.

In an embodiment, the stage may further include: a first initializing transistor, which is connected between a second power line to which a second voltage having a lower level than the first voltage is provided and the gate electrode of the second transistor; and a second initializing transistor connected between the second power line and the gate electrode of the third transistor, and a gate electrode of the first initializing transistor and a gate electrode of the second initializing transistor may be connected to the third clock line.

In an embodiment, the stage may further include a blocking transistor connected between the first node and a fourth node, one end of the fifth transistor and one end of the sixth transistor may be connected to the fourth node, and a gate electrode of the blocking transistor may be connected to a fourth clock line.

BRIEF DESCRIPTION OF THE FIGURES

The accompanying drawings are included to provide a further understanding of the invention and are incorporated in and constitute a part of this specification. The drawings illustrate embodiments of the invention and, together with the description, serve to explain principles of the invention. In the drawings.

DETAILED DESCRIPTION

Figure 1A:
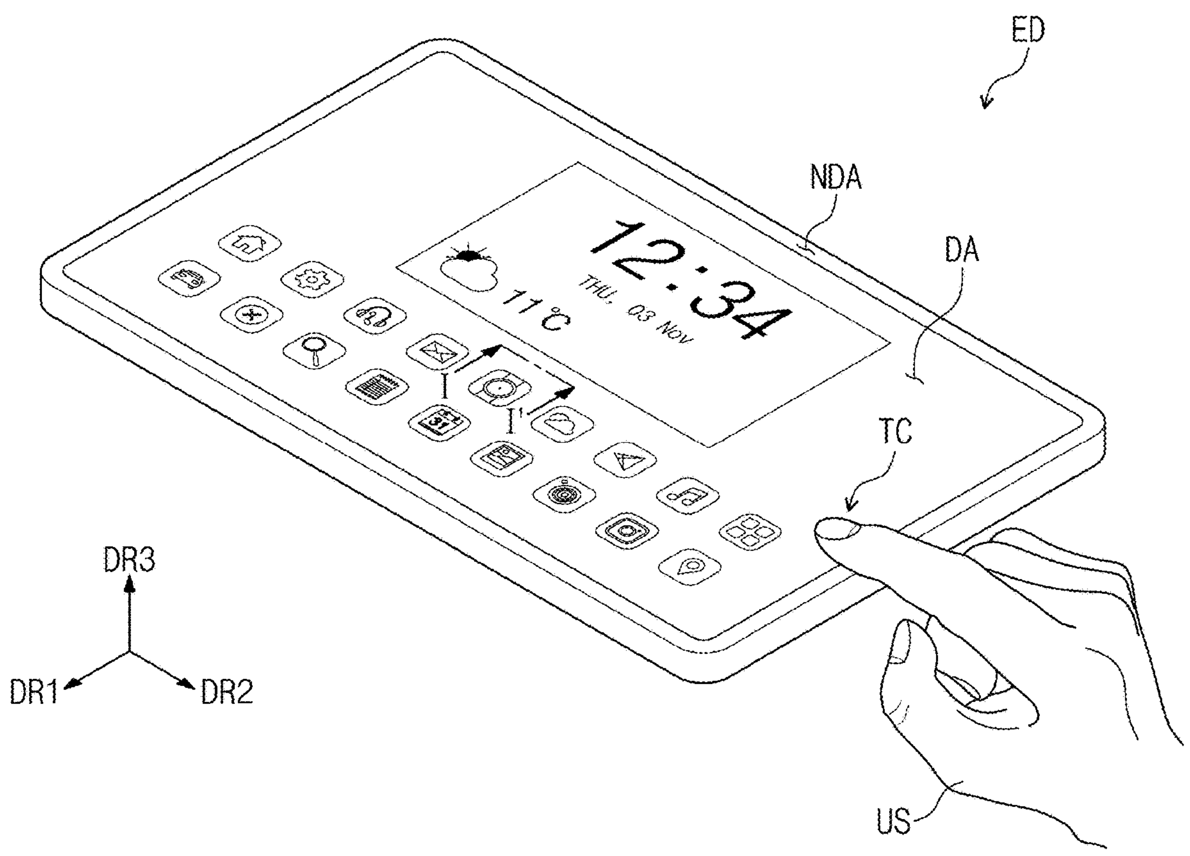
FIG. 1A is a perspective view of an electronic device according to an embodiment of the invention.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like numbers refer to like elements throughout. Also, in the figures, the thickness, ratio, and dimensions of components are exaggerated for clarity of illustration. The term "and/or" includes any and all combinations of one or more of the associated listed items.

Although the terms "first," "second," etc. may be used herein to describe various elements, these elements should not be limited by these terms. The terms are only used to distinguish one component from other components. For example, a first element referred to as a first element in an embodiment can be referred to as a second element in another embodiment without departing from the scope of the appended claims. The singular forms include the plural forms as well, unless the context clearly indicates otherwise.

Also, "under", "below", "above', "upper", and the like are used for explaining relation association of components illustrated in the drawings. These terms are used as a spatially relative concept and are described based on the directions indicated in the drawings.

It will be understood that the term "include" or "comprise", when used in this specification, specifies the presence of stated features, integers, steps, operations, elements, components, or a combination thereof, but does not preclude the presence or addition of one or more other features, integers, steps, operations, elements, components, or combinations thereof.

The term "unit" refers to a software component or hardware component that performs a specific function. Hardware components may include, for example, FPGA (field-programmable gate array) or ASIC (application-specific integrated circuit). Software components may refer to executable code and/or data used by executable code within addressable storage media. Therefore, software components can be, for example, object-oriented software components, class components, and task components, and may include processes, functions, attributes, procedures, subroutines, program code segments, drivers, firmware, microcode, circuits, data, databases, data structures, tables, arrays, or variables.

Unless otherwise defined, all terms (including technical and scientific terms) used herein have the same meaning as commonly understood by one of ordinary skill in the art to which the present disclosure belongs. In addition, terms such as those defined in commonly used dictionaries should be interpreted as having meanings consistent with their meanings in the context of the relevant technology, and unless explicitly defined, it should not be interpreted in an overly idealistic or overly formal sense.

Hereinafter, embodiments of the invention are described with reference to the drawings.

Figure 1B:
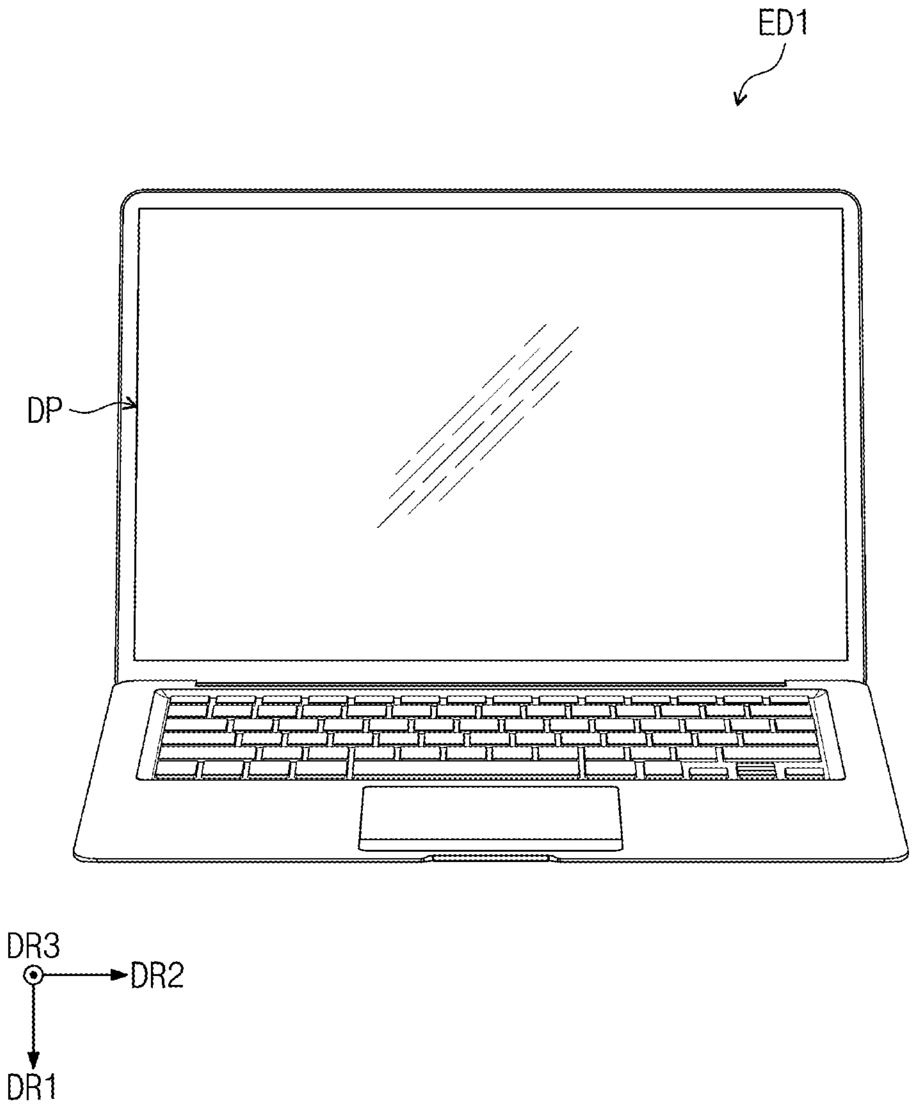
FIG. 1B is a perspective view of an electronic device according to an embodiment of the invention.

FIG. 1A is a perspective view of an electronic device ED according to an embodiment of the invention. FIG. 1B is a perspective view of an electronic device ED1 according to an embodiment of the invention.

Referring to FIGS. 1A and 1B, the electronic devices ED and ED1 may be devices that are activated according to an electrical signal. For example, the electronic devices ED and ED1 may be mobile phones, foldable mobile phones, tablet computers, vehicle navigation devices, game consoles, or wearable devices, but the embodiment of the invention is not limited thereto. In FIG. 1A, the electronic device ED is illustrated as a tablet, for example, and in FIG. 1*b*, the electronic device ED1 is illustrated as a laptop, for example.

In FIG. 1A, a display area DA and a non-display area NDA may be defined in the electronic device ED. The electronic device ED may display an image through the display area DA. The display area DA may include a plane defined by a first direction DR1 and a second direction DR2. The non-display area NDA may surround a periphery of the display area DA.

A thickness direction of each of the electronic devices ED and ED1 may be parallel to a third direction DR3 that crosses the first direction DR1 and the second direction DR2. Thus, a front surface (or a top surface) and a rear surface (or a bottom surface) of members constituting each of the electronic devices ED and ED1 may be defined by the third direction DR3.

The electronic devices ED and ED1 may each include a display panel DP. The display panel DP may display an image and sense an input applied from the outside. In FIG. 1A, the electronic device ED may detect an input TC applied from the outside. The input TC refers to an input by a passive-type input means, which may include an input by the user's US body, and may include any input that may change capacitance of an input sensor. Also, the display device ED may also sense the input TC of the user, which is applied to a side surface or the rear surface of the display device ED depending on a structure of the display device ED, but it is not limited to any one embodiment.

Figure 2:
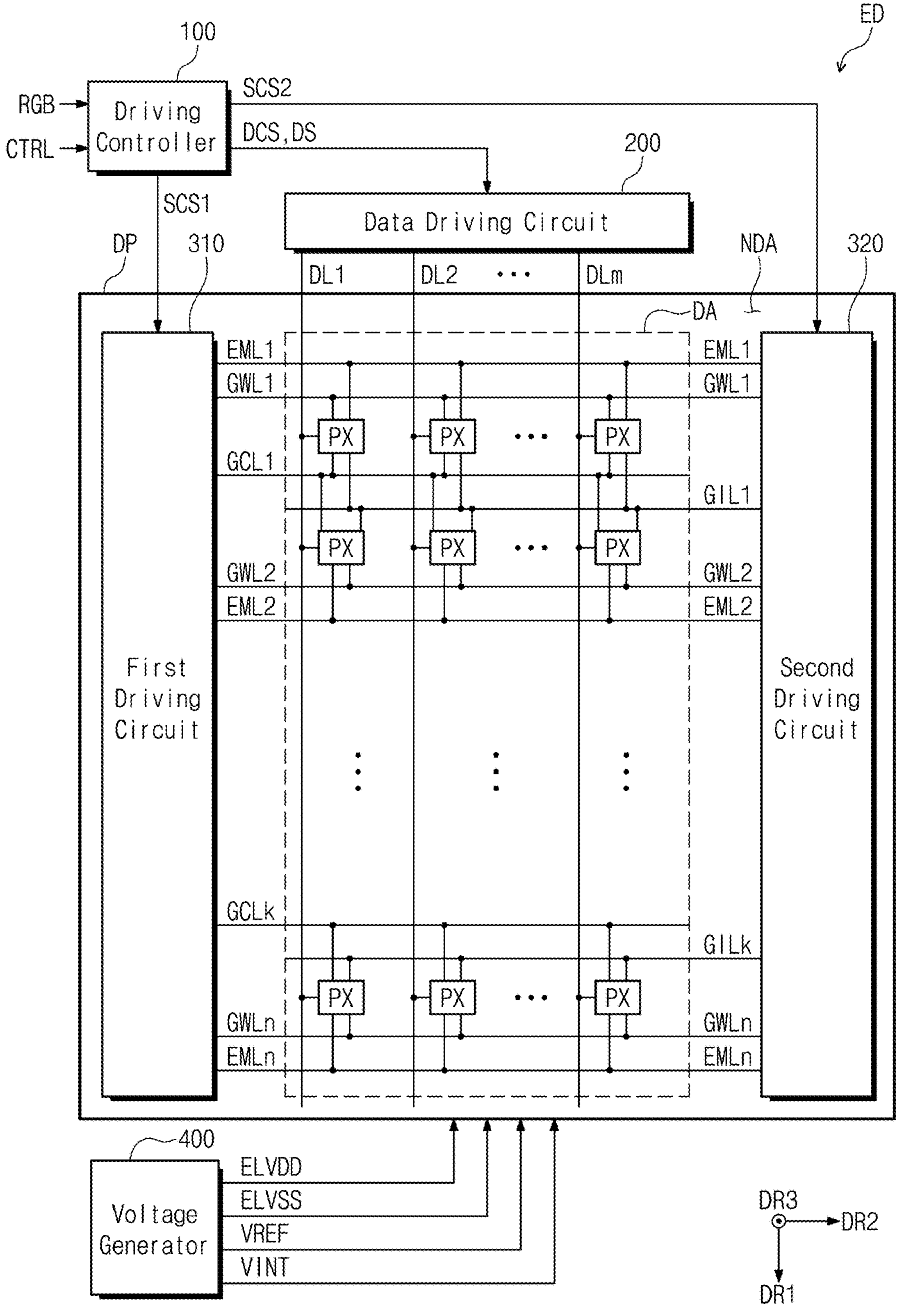
FIG. 2 is a block diagram of the electronic device according to an embodiment of the invention.

FIG. 2 is a block diagram of the electronic device ED according to an embodiment of the invention.

Referring to FIG. 2, the electronic device ED may include a display panel DP, a driving controller 100, a data driving circuit 200, a first driving circuit 310, a second driving circuit 320, and a voltage generator 400.

The display panel DP may include the display area DA and the non-display area NDA.

The driving controller 100 may receive an input signal that includes an input image signal RGB and a control signal CTRL. The driving controller 100 may generate an output image signal DS by converting a data format of the input image signal RGB to match the interface specifications of the data driving circuit 200. The driving controller 100 may output a first control signal SCS1, a second control signal SCS2, and a data control signal DCS to control the display of images on the display panel DP.

The data driving circuit 200 may receive the data control signal DCS and the output image signal DS from the driving controller 100. The data driving circuit 200 may convert the output image signal DS into data signals and output the data signals to a plurality of data lines DL1 to DLm, which will be described later. The data signals are analog voltages corresponding to the gradation values of the output image signal DS.

The display panel DP may include the plurality of data lines DL1 to DLm, a plurality of scan lines GIL1 to GILk, GCL1 to GCLk, and GWL1 to GWLn, a plurality of emission control lines EML1 to EMLn, and a plurality of pixels PX.

The data lines DL1 to DLm extend in the first direction DR1 from the data driving circuit 200 and are arranged spaced apart from each other in the second direction DR2.

The display panel DP may include the first driving circuit 310 and the second driving circuit 320. In an embodiment, the first driving circuit 310 may be disposed on a first side of the display panel DP, and the second driving circuit 320 may be disposed on a second side of the display panel DP. However, the embodiment is not limited thereto.

In an example shown in FIG. 2, the first driving circuit 310 and the second driving circuit 320 are arranged facing each other on the non-display area NDA with the display area DA in between, but the invention is not limited thereto. In another embodiment, at least a portion of each of the first driving circuit 310 and the second driving circuit 320 may be disposed on the display area DA. Alternatively, both the first driving circuit 310 and the second driving circuit 320 may be disposed at one side of the display area DA. The display panel DP may include at least one of the first driving circuit 310 and the second driving circuit 320.

The scan lines GIL1 to GILk, GCL1 to GCLk, and GWL1 to GWLn may include compensation scan lines GCL1 to GCLk, initialization scan lines GIL1 to GILk, and write scan lines GWL1 to GWLn, respectively.

The compensation scan lines GCL1 to GCLk may be electrically connected to the first driving circuit 310. The initialization scan lines GIL1 to GILk may be electrically connected to the second driving circuit 320. Additionally, the write scan lines GWL1 to GWLn and the emission control lines EML1 to EMLn may be electrically connected to the first driving circuit 310 and the second driving circuit 320.

The first driving circuit 310 may receive the first control signal SCS1 from the driving controller 100. The first driving circuit 310 may output scan signals to the compensation scan lines GCL1 to GCLk and the write scan lines GWL1 to GWLn in response to the first control signal SCS1, and output emission signals to the emission control lines EML1 to EMLn.

The second driving circuit 320 may receive the second control signal SCS2 from the driving controller 100. The second driving circuit 320 may output scan signals to the initialization scan lines GIL1 to GILk and the write scan lines GWL1 to GWLn in response to the second control signal SCS2, and output emission signals to the emission control lines EML1 to EMLn.

Additionally, in an embodiment of the invention, the write scan lines GWL1 to GWLn and the emission control lines EML1 to EMLn may be electrically connected to the first driving circuit 310 and the second driving circuit 320, respectively to receive the signal. For example, one write scan line GWL1 may receive the same signal from the first driving circuit 310 and the second driving circuit 320. Additionally, one emission control line EML1 may receive the same signal from the first driving circuit 310 and the second driving circuit 320.

The pixels PX may be electrically connected to the compensation scan lines GCL1 to GCLk, the initialization scan lines GIL1 to GILk, the write scan lines GWL1 to GWLn, the emission control lines EML1 to EMLn, and the data lines DL1 to DLm, respectively. Each of the pixels PX may be electrically connected to three scan lines and one emission control line.

In an embodiment of the invention, the pixels PX may include a plurality of pixel rows. Each of the pixel rows may be electrically connected in a one-to-one correspondence with one write scan line and one emission control line. Additionally, two pixel rows spaced apart in the first direction DR1 may be commonly connected to one compensation scan line and one initialization scan line. For example, as shown in FIG. 2, a first pixel row may be connected to a first compensation scan line GCL1, a first initialization scan line GIL1, a first write scan line GWL1, and a first emission control line EML1, and a second pixel row may be connected to the first compensation scan line GCL1, the first initialization scan line GIL1, a second write scan line GWL2, and a second emission control line EML2.

As described above, since each of the pixel rows corresponds one-to-one to one write scan line and one emission control line, the number of write scan lines GWL1 to GWLn and emission control lines EML1 to EMLn may be the same as the number of pixel rows. Thus, the number of pixel rows may correspond to the value of n. In addition, since two pixel rows are commonly connected to one compensation scan line and one initialization scan line, the number of compensation scan lines GCL1 to GCLk and initialization scan lines GIL1 to GILk may be half the number of write scan lines GWL1 to GWLn and emission control lines EML1 to EMLn. Therefore, the number of write scan lines GWL1 to GWLn and emission control lines EML1 to EMLn may be n, corresponding to the 'n' in the reference symbols and matching the number of pixel rows, while the number of compensation scan lines GCL1 to GCLk and initialization scan lines GIL1 to GILk may be k. Here, when the reference symbol n is an even number, the reference symbol k may be n/2, and when n is an odd number, k may be (n+1)/2.

Each pixel PX includes a light-emitting element EE (see FIG. 4) and a pixel circuit PXC (see FIG. 4) that controls the emission of the light-emitting element EE. The pixel circuit PXC may include one or more transistors and one or more capacitors. The first driving circuit 310 and the second driving circuit 320 may include transistors provided through the same process as the pixel circuit PXC.

The voltage generator 400 may generate voltages for an operation of the display panel DP. In an embodiment of the invention, the voltage generator 400 may generate a first driving voltage ELVDD, a second driving voltage ELVSS, a reference voltage VREF, and an initialization voltage VINT.

Each pixel PX may receive the first driving voltage ELVDD, the second driving voltage ELVSS, the reference voltage VREF, and the initialization voltage VINT.

Figure 3:
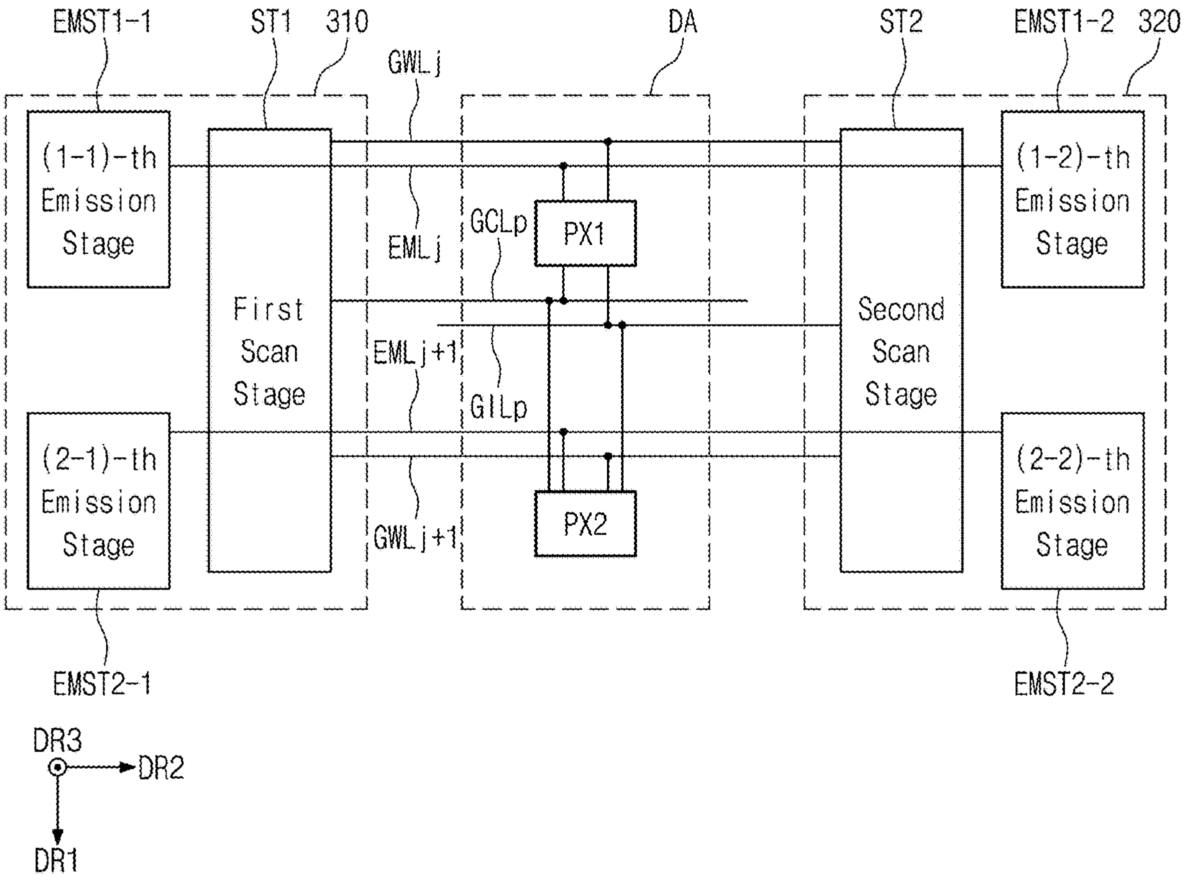
FIG. 3 is a schematic block diagram illustrating a portion of the electronic device according to an embodiment of the invention.

FIG. 3 is a schematic block diagram illustrating a portion of the electronic device ED according to an embodiment of the invention.

In FIG. 3, a first pixel PX1 and a second pixel PX2, which are electrically connected to a portion of the first driving circuit 310 and the second driving circuit 320 of FIG. 2, are illustrated as an example. The second pixel PX2 shown in FIG. 3 may be the closest pixel among the pixels spaced apart from the first pixel PX1 in the first direction DR1. For example, the first pixel PX1 may be a pixel included in a j-th pixel row, and the second pixel PX2 may be a pixel which is included in a (j+1)-th pixel row and disposed in the same column as the first pixel PX1.

Referring to FIGS. 2 and 3, the first driving circuit 310 may include a first scan stage ST1, a (1-1)-th emission stage EMST1-1, and a (2-1)-th emission stage EMST2-1. The second driving circuit 320 may include a second scan stage ST2, a (1-2)-th emission stage EMST1-2, and a (2-2)-th emission stage EMST2-2.

In an embodiment of the invention, the first scan stage ST1 may be electrically connected to a p-th compensation scan line GCLp, a j-th write scan line GWLj, and a (j+1)-th write scan line GWLj+1. The second scan stage ST2 may be electrically connected to a p-th initialization scan line GILp, the j-th write scan line GWLj, and the (j+1)-th write scan line GWLj+1. Here, when the reference symbol j is an even number, the reference symbol p may be j/2, and when j is an odd number, p may be (j+1)/2.

The (1-1)-th emission stage EMST1-1 and the (1-2)-th emission stage EMST1-2 may be electrically connected to a j-th emission control line EMLj. The (2-1)-th emission stage EMST2-1 and the (2-2)-th emission stage EMST2-2 may be electrically connected to a (j+1)-th emission control line EMLj+1.

In an embodiment of the invention, the first pixel PX1 may be electrically connected to the p-th compensation scan line GCLp, the j-th write scan line GWLj, the p-th initialization scan line GILp, and the j-th emission control line EMLj. The second scan stage PX2 may be electrically connected to the p-th compensation scan line GCLp, the (j+1)-th write scan line GWLj+1, the p-th initialization scan line GILp, and the (j+1)-th emission control line EMLj+1. Therefore, the p-th compensation scan line GCLp and the p-th initialization scan line GILp may be commonly connected to the first pixel PX1 and the second pixel PX2.

In FIG. 3, the (1-1)-th emission stage EMST1-1 and the (1-2)-th emission stage EMST1-2 are illustrated as being disposed with the display area DA therebetween, but it is not limited thereto. The (1-1)-th emission stage EMST1-1 and the (1-2)-th emission stage EMST1-2 may be arranged at one side, or one of the (1-1)-th emission stage EMST1-1 and the (1-2)-th emission stage EMST1-2 may be omitted in other embodiments. Additionally, although the (1-1)-th emission stage EMST1-1 and the (1-2)-th emission stage EMST1-2 are described as examples, the description may also be applied to the (2-1)-th emission stage EMST2-1 and the (2-2)-th emission stage EMST2-2.

In FIG. 3, although one scan stage and two emission stages, which are included in each of the first driving circuit (310) and the second driving circuit (320), are described as examples, the first driving circuit (310) and the second driving circuit (320) may be provided with n/2 first scan stages and n/2 second scan stages, which are electrically connected to n pixel rows, respectively. The first scan stages will be described in detail with reference to FIG. 5.

Figure 4:
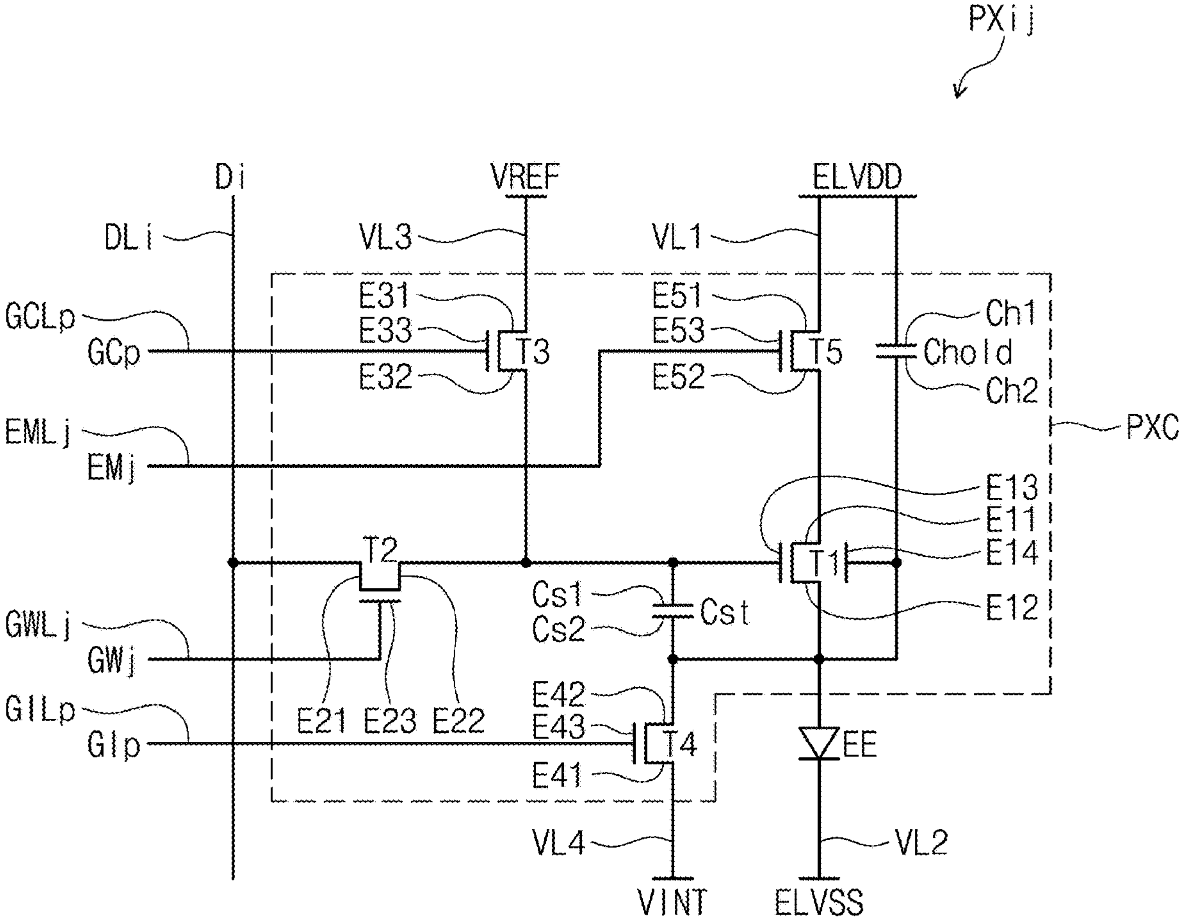
FIG. 4 is an equivalent circuit diagram of a pixel according to an embodiment of the invention.

FIG. 4 is an equivalent circuit diagram of a pixel PXij according to an embodiment of the invention.

Referring to FIGS. 2 and 4, for example, an equivalent circuit diagram of the pixel Pxij, which is connected to an i-th data line DLi of the data lines DL1 to DLm, the p-th compensation scan line GCLp of the compensation scan lines GCL1 to GCLk, the p-th initialization scan line GILp of the initialization scan lines GIL1 to GILk, the j-th write scan line GWLj of the write scan lines GLW1 to GWLn, and the j-th emission control line EMLj of the emission control lines EML1 to EMLn, is illustrated. Each of the pixels PX shown in FIG. 2 may have the same configuration as the equivalent circuit diagram of the pixel PXij shown in FIG. 4.

The pixel circuit PXC may include first to fifth thin-film transistors T1, T2, T3, T4 and T5, a hold capacitor Chold, and a transfer capacitor Cst (or referred to as a capacitor). The pixel PXij shown in FIG. 4 is merely an example, and the circuit configuration of the pixel Pxij may be modified and implemented.

Each of the first to fifth thin-film transistors T1, T2, T3, T4 and T5 may be an N-type thin-film transistor having an oxide semiconductor layer. A first thin-film transistor T1 may be referred to as a driving thin-film transistor, a second thin-film transistor T2 as a switching thin-film transistor, a third thin-film transistor T3 as a compensation thin-film transistor, a fourth thin-film transistor T4 as an initializing thin-film transistor, and a fifth thin-film transistor T5 as an emission control thin-film transistor.

The compensation scan line GCLp and initialization scan line GILp may transfer a compensation scan signal GCp and an initialization scan signal GIp respectively, the write scan line GWLj may transfer a write scan signal GWj, and the emission control line EMLj may transfer an emission control signal EMj. The data line DLi may transfer a data signal Di. The data signal Di may have a voltage level corresponding to the video signal RGB input to the electronic device ED (see FIG. 2).

First to fourth driving voltage lines VL1, VL2, VL3, and VL4 may transfer the first driving voltage ELVDD, the second driving voltage ELVSS, the reference voltage VREF, and the initialization voltage VINT to the pixel PXij, respectively.

The first thin-film transistor T1 may include a first electrode E11 electrically connected to the first driving voltage line VL1 via the fifth thin-film transistor T5, a second electrode E12 electrically connected to an anode of the light-emitting element EE, a first gate electrode E13, and a second gate electrode E14. The first gate electrode E13 may be referred to as a gate electrode, and the second gate electrode E14 can may be referred to as a back gate electrode. A portion in which the second electrode E12 of the first thin-film transistor T1 is connected to the light-emitting element EE may be defined as a second pixel node N2.

The hold capacitor Chold may be connected between the first driving voltage line VL1 and the second gate electrode E14 of the first thin-film transistor T1. A first hold opposing electrode Ch1 of the hold capacitor Chold may be connected to the first driving voltage line VL1, and a second hold opposing electrode Ch2 of the hold capacitor Chold may be connected to the second gate electrode E14 of the first thin-film transistor T1. In an embodiment of the invention, the hold capacitor Chold may be omitted. Also, the first thin-film transistor T1 may not include the second gate electrode E14.

The second thin-film transistor T2 may include a first electrode E21 connected to the data line DLi, a second electrode E22 connected to a first pixel node N1, and a gate electrode E23 connected to the write scan line GWLj. The second thin-film transistor T2 may transfer the data signal Di received through the data line DLi to the first pixel node N1 in response to the write scan signal GWj received through the write scan line GWLj.

The transfer capacitor CST may be electrically connected between the first node N1 and the second node N2. A first opposing electrode Cs1 of the transfer capacitor Cst may be connected to the first pixel node N1, and a second opposing electrode Cs2 of the transfer capacitor Cst may be connected to the second pixel node N2.

The third thin-film transistor T3 may include a first electrode E31 connected to the third driving voltage line VL3, a second electrode E32 connected to the first pixel node N1, and a gate electrode E33 connected to the compensation scan line GCLp. The third thin-film transistor T3 may be turned on by the compensation scan signal GCp received through the compensation scan line GCLp to transfer the reference voltage VREF to the first pixel node N1.

The fourth thin-film transistor T4 may include a first electrode E41 connected to the fourth driving voltage line VL4, a second electrode E42 connected to the second pixel node N2, and a gate electrode E43 connected to the initialization scan line GILp. The fourth thin-film transistor T4 may be turned on by the initialization scan signal GIp received through the initialization scan line GILp and to transfer the initialization voltage VINT received through the fourth driving voltage line VL4 to the second pixel node N2.

The fifth thin-film transistor T5 may include a first electrode E51 connected to the first driving voltage line VL1, a second electrode E52 connected to the first electrode E11 of the first thin-film transistor T1, and a gate electrode E53 connected to the emission control line EMLj. The fifth thin-film transistor T5 may be turned on by the emission control signal EMj received through the emission control line EMLj to electrically connect the first driving voltage line VL1 to the first electrode E11 of the first thin-film transistor T1.

The light-emitting element EE may include an anode connected to the second electrode E12 of the first thin-film transistor T1 or the second pixel node N2 and a cathode connected to the second driving voltage line VL2. The light-emitting element (EE) may be an organic light-emitting diode that includes an organic light-emitting layer, but it is not particularly limited thereto.

Figure 5:
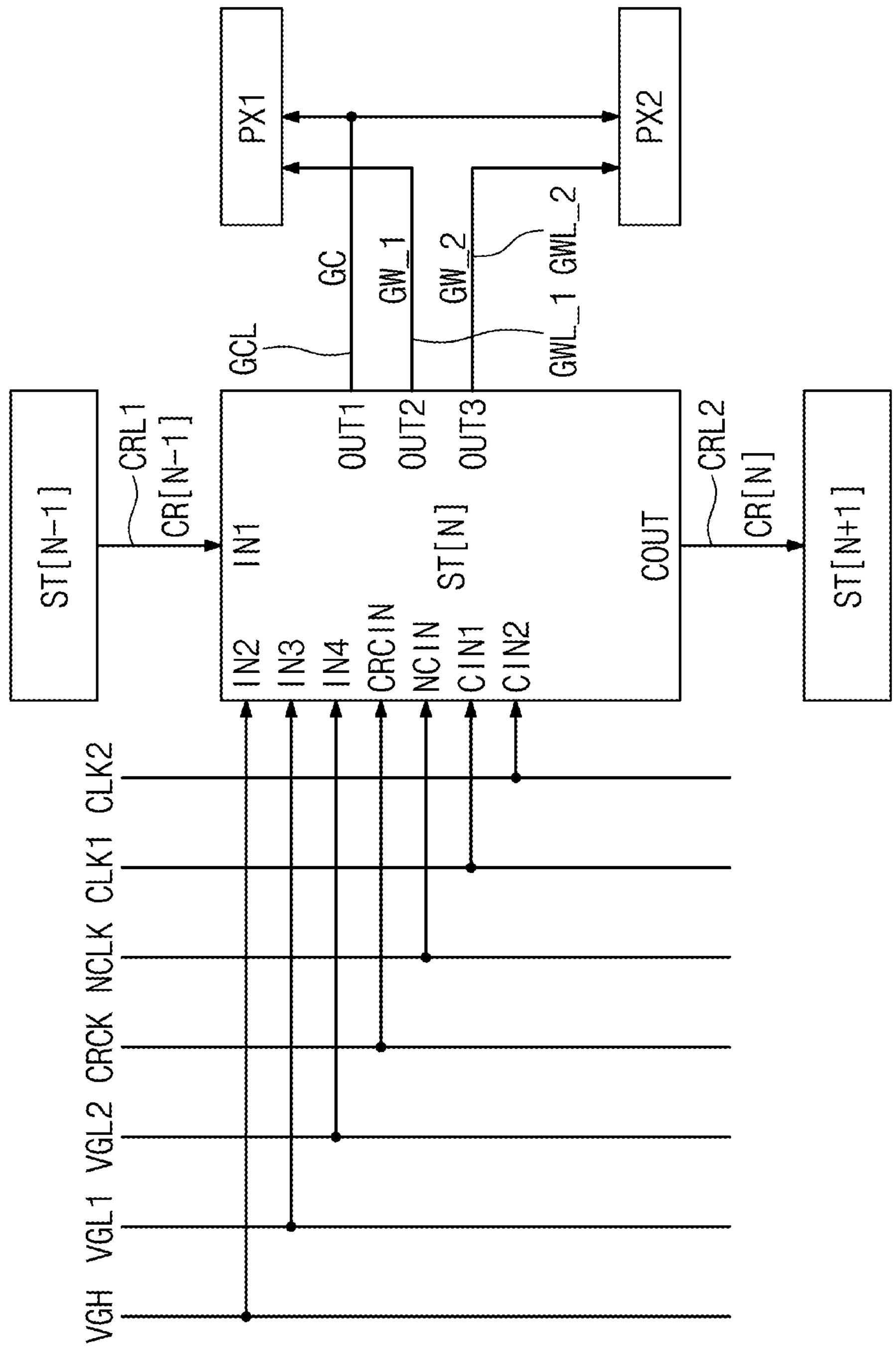
FIG. 5 is a view of stages according to an embodiment of the invention.
Figure 6:
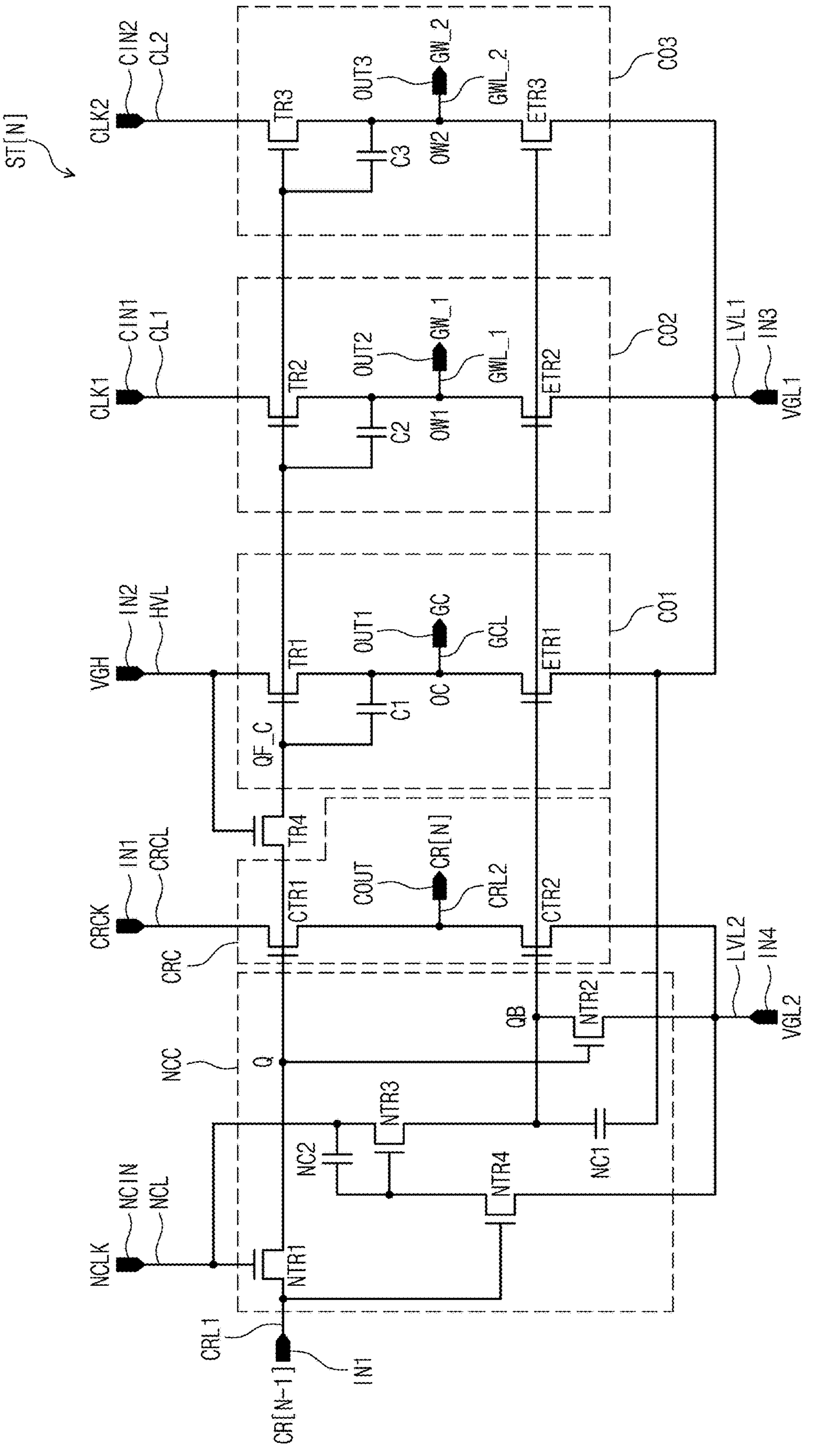
FIG. 6 is an equivalent circuit diagram of one stage according to an embodiment of the invention.
Figure 7:
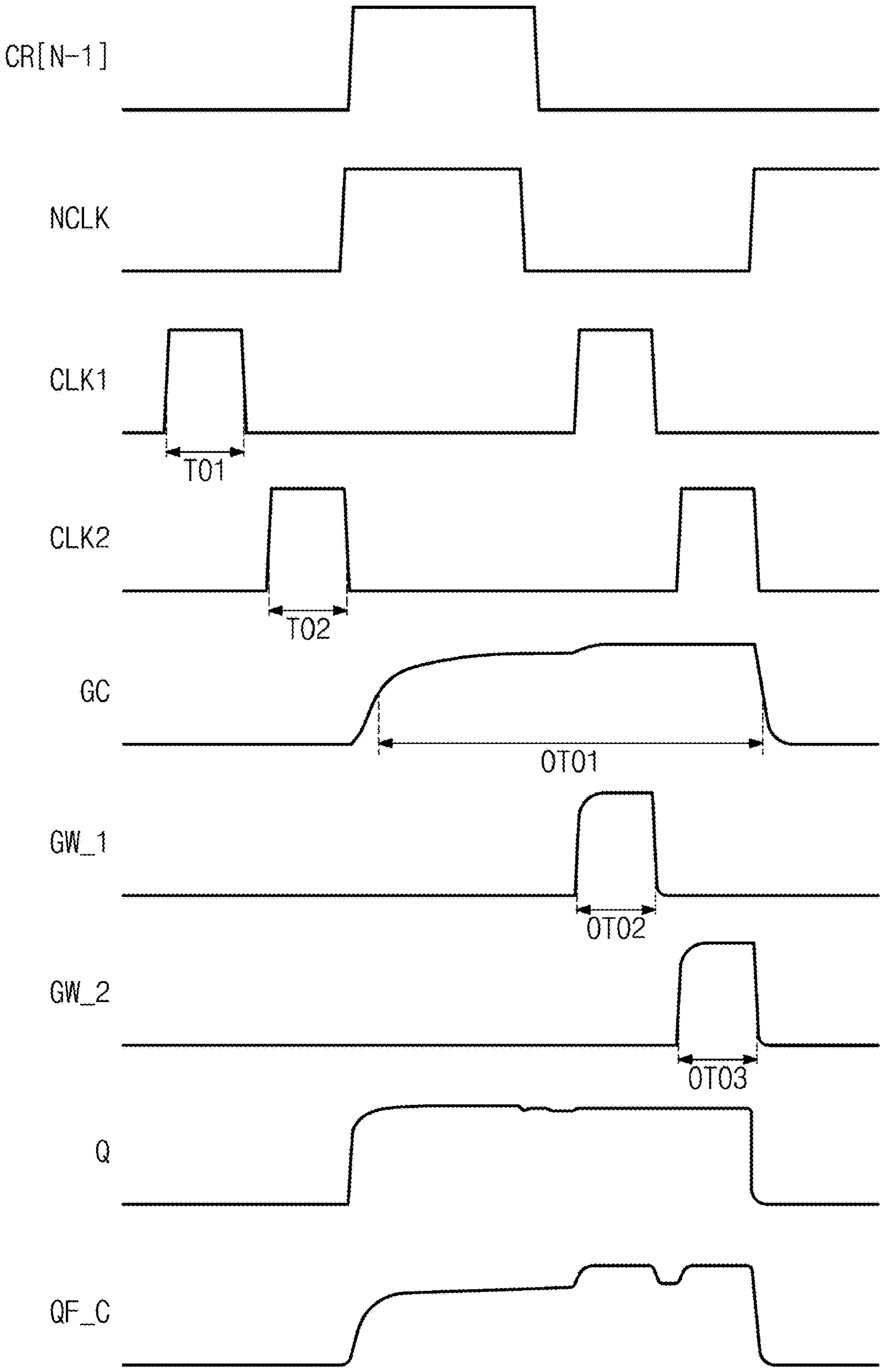
FIG. 7 is a timing diagram of signals input to or output from the one stage according to an embodiment of the invention.

FIG. 5 is a view showing stages ST[N−1], ST[N], and ST[N+1] according to one embodiment of the invention. FIG. 6 is an equivalent circuit diagram of one stage ST[N] according to an embodiment of the invention. FIG. 7 is a timing diagram of signals input to or output from the one stage ST[N] according to an embodiment of the invention. FIGS. 5, 6, and 7 are views that provide a detailed explanation of the first scan stage ST1 described in FIG. 3.

In FIG. 5, three of the first scan stages ST[N−1], ST[N], and ST[N+1] included in the first driving circuit 310 are illustrated as an example. Hereinafter, the first scan stages ST[N−1], ST[N], and ST[N+1] are referred to as stages ST[N−1], ST[N], and ST[N+1].

FIG. 6 illustrates an example of an equivalent circuit diagram of one stage ST[N]. Since the remaining stages ST[N−1] and ST[N+1] also include substantially the same configurations, redundant explanations are omitted. The configuration of the one stage ST[N] according to the invention is not limited to the embodiment shown in FIG. 6. The one stage ST[N] shown in FIG. 6 is merely an example, and the circuit configuration of the one stage ST[N] may be modified and implemented.

Referring to FIG. 5, the stages ST[N−1], ST[N], and ST[N+1] may be sequentially referred to as a first peripheral stage ST[N−1], a reference stage ST[N], and a second peripheral stage ST[N+1]. Alternatively, the reference stage ST[N] may be referred to as a stage ST[N]. Hereinafter, the reference stage ST[N] is referred to as the stage ST[N].

The stage ST[N] may include first to fourth input terminals IN1, IN2, IN3, and IN4, a first clock terminal CIN1, a second clock terminal CIN2, a first control terminal CRCIN, a second control terminal NCIN, first to third output terminals OUT1, OUT2, and OUT3, and a carry output terminal COUT.

A first input terminal IN1 of the stage ST[N] may receive a carry signal CR[N−1] output from the previous stage, for example, from the first peripheral stage ST[N−1]. When the stage ST[N] is the first stage, a first input terminal IN1 may receive a start signal output from a dummy stage before the first stage.

The carry signal CR[N−1] may be referred to as a previous carry signal CR[N−1], hereinafter. The first peripheral stage ST[N−1] and the stage ST[N] may be electrically connected to a first carry line CRL1, and the first carry line CRL1 may also be referred to as a first peripheral carry line. The previous carry signal CR[N−1] generated in the first peripheral stage ST[N−1] may be transferred to the stage ST[N] via the first carry line CRL1.

A second input terminal IN2 of the stage ST[N] may receive a first voltage VGH. A third input terminal IN3 of the stage ST[N] may receive a second voltage VGL1, and a fourth input terminal IN4 may receive a third voltage VGL2. The second voltage VGL1 may have a lower level than the first voltage VGH, and the third voltage VGL2 may have a lower level than each of the first voltage VGH and the second voltage VGL1. However, the voltages are not limited thereto, and the second voltage VGL1 and the third voltage VGL2 may have the same level or different levels from each other in embodiments.

The stage ST[N] may receive a carry clock signal CRCK through the first control terminal CRCIN and receive an input clock signal NCLK through the second control terminal NCIN. The stage ST[N] may receive a first clock signal CLK1 through the first clock terminal CIN1 and a second clock signal CLK2 through the second clock terminal CIN2. In one embodiment of the present invention, the first clock terminal CIN1 and the second clock terminal CIN2 of each of the first peripheral stage ST[N−1] and the second peripheral stage ST[N+1], may receive clock signals with phases that are inverted relative to the first clock signal CLK1 and the second clock signal CLK2, respectively.

The carry output terminal COUT of stage ST[N] may output a carry signal CR[N]. The carry signal CR[N] may be transferred to the second peripheral stage ST[N+1]. The second peripheral stage ST[N+1] may be electrically connected to a second carry line CRL2. The carry signal CR[N] generated in the stage ST[N] may be transferred to the second peripheral stage ST[N+1] via the second carry line CRL2.

A first output terminal OUT1 of the stage ST[N] may output a first output signal GC, and a second output terminal OUT2 and the third output terminal OUT3 may output a second output signal GW_1 and a third output signal GW_2, respectively. The first output signal GC, the second output signal GW_1, and the third output signal GW_2 may be referred to as a compensation scan signal GC, a first write scan signal GW_1, and a second write scan signal GW_2, respectively.

The compensation scan signal GC may be commonly provided to the first pixel PX1 and the second pixel PX2, and the first write scan signal GW_1 and the second write scan signal GW_2 may be provided to the first pixel PX1 and the second pixel PX2, respectively. The second pixel PX2 is the closest pixel spaced apart in the first direction DR1 from the first pixel PX1, and the first and second pixels PX1 and PX2 may be pixels arranged in the same column.

The stage ST[N] may be electrically connected to the first pixel PX1 and the second pixel PX2. The compensation scan signal GC generated from the stage ST[N] may be commonly transferred to the first pixel PX1 and the second pixel PX2 through the compensation scan line GCL electrically connected to the stage ST[N]. The first write scan signal GW_1 generated from the stage ST[N] may be transferred to the first pixel PX1 via the first write scan line GWL_1, which is electrically connected to the stage ST[N], and the second write scan signal GW_2 generated from the stage ST[N] may be transferred to the second pixel PX2 via the second write scan line GWL_2, which is electrically connected to the stage ST[N].

Referring to FIGS. 6 and 7, the one stage ST[N] may include a first node Q, a second node QB, and a third node QF_C. The first node Q may be referred to as a Q node, and the second node QB may be referred to as a QB node.

In one embodiment of the invention, the one stage ST[N] may include a node control circuit NCC, a carry circuit CRC, a first output circuit CO1, a second output circuit CO2, and a third output circuit CO3.

The node control circuit NCC may control voltages of the first node Q and the second node QB. The node control circuit NCC may include a first node transistor NTR1, a second node transistor NTR2, a third node transistor NTR3, and a fourth node transistor NTR4.

The first node transistor NTR1 may be connected between the first carry line CRL1, which receives a previous carry signal CR[N−1] through the first input terminal IN1, and the first node Q. A gate electrode of the first node transistor NTR1 may be connected to an input clock line NCL that receives the input clock signal NCLK through the second control terminal NCIN. An operation of the first node transistor NTR1 may be controlled in response to the input clock signal NCLK. When the first node transistor NTR1 is turned on, the previous carry signal CR[N−1] may be transferred to the first node Q. For example, when the input clock signal (NCLK) is at a logical high level, the first node transistor NTR1 may be turned on, the previous carry signal CR[N−1] may be transferred to the first node Q. Here, a voltage of the first node (Q) may increase to a logical high level.

The second node transistor NTR2 may be connected between a third power line LVL2, to which a third voltage VGL2 is supplied through the second input terminal IN2, and the second node QB. A gate electrode of the second node transistor NTR2 may be connected to the first node Q. An operation of the second node transistor NTR2 may be controlled in response to a voltage of the first node Q. When the second node transistor NTR2 is turned on, the third voltage VGL2 may be transferred to the second node QB.

The third node transistor NTR3 may be connected between the input clock line NCL and the second node QB. A gate electrode of the third node transistor NTR3 may be connected between one end of the fourth node transistor NTR4 and one end of the second node capacitor NC2. The fourth node transistor NTR4 may be connected between the third power line LVL2, to which the third voltage VGL2 is supplied, and a gate electrode of the third node transistor NTR3. A gate electrode of the fourth node transistor NTR4 may be connected to the first carry line CRL1. An operation of the fourth node transistor NTR4 may be controlled in response to the previous carry signal CR[N−1]. When the fourth node transistor NTR4 is turned on, the third voltage VGL2 may be transferred to the gate electrode of the third node transistor NTR3.

The node control circuit NCC may further include a first node capacitor NC1 electrically connected between a second power line LVL1 to which a second voltage VGL1 is supplied through the third input terminal IN3 and a second node QB, and a second node capacitor NC2 electrically connected between the gate electrode of the third node transistor NTR3 and one end of the third node transistor NTR3.

The carry circuit CRC may include a first carry transistor CTR1 and a second carry transistor CTR2.

The first carry transistor CTR1 and the second carry transistor CTR2 may be connected to each other in series. The first carry transistor CTR1 and the second carry transistor CTR2 may be connected between a carry clock line CRCL, to which the carry clock signal CRCK is supplied through the first control terminal CRCIN, and the third power line LVL2, to which the third voltage VGL2 is supplied through the fourth input terminal IN4. A gate electrode of the first carry transistor CTR1 may be connected to the first node Q, and a gate electrode of the second carry transistor CTR2 may be connected to the second node QB.

An operation of the first carry transistor CTR1 may be controlled in response to a voltage of the first node Q. An operation of the second carry transistor CTR2 may be controlled in response to a voltage of the second node QB. When the first carry transistor CTR1 is turned on, the carry clock signal CRCK may be transferred to the second carry line (CRL2), and when the second carry transistor CTR2 is turned on, the third voltage VGL2 may be transferred to the second carry line CRL2. The second carry transistor CTR2 may be referred to as a pull-down transistor.

The first output circuit CO1 may include a first transistor TR1, a first capacitor C1, a first pull-down transistor ETR1, and a fourth transistor TR4.

The first transistor TR1 may be connected between a first power line HVL to which the first voltage VHG is supplied through the second input terminal IN2, and a first output node OC. A gate electrode of the first transistor TR1 may be connected to the third node QF_C. An operation of the first transistor TR1 may be controlled in response to a voltage of the third node QF_C. When the first transistor TR1 is turned on, the first voltage VGH may be transferred to the first output node OC.

The first capacitor C1 may be connected between the gate electrode of the first transistor TR1 and the first output node OC. The first capacitor C1 may boost up the voltage of the third node QF_C in response to the voltage of the first output node (OC). When the voltage of the third node QF_C is boosted up, the first voltage VGH, which is the high voltage, may be output to the compensation scan line GCL through the first output node OC without distortion. A signal output through the compensation scan line GCL may be the compensation scan signal GC.

The first pull-down transistor ETR1 may be connected between the second power line LVL1 and the first transistor TR1. A gate electrode of the first pull-down transistor ETR1 may be connected to the second node QB. An operation of the first pull-down transistor ETR1 may be controlled in response to the voltage of the second node QB. When the first pull-down transistor ETR1 is turned on, the second voltage VGL1 may be transferred to the first output node OC.

The fourth transistor TR4 may be connected between the first node Q and the gate electrode of the first transistor TR1. A gate electrode of the fourth transistor TR4 may be connected to the first power line HVL. The fourth transistor TR4 may remain in a turn-on state in response to the first voltage VGH. When the fourth transistor TR4 is turned on, the voltage of the first node Q may be transferred to the third node QF_C. Therefore, when the voltage of the first node Q is at a logical high level, the voltage of the third node QF_C may also be at a logical high level.

When a logical high-level voltage is transferred to the third node QF_C through the fourth transistor TR4, which remains in a turn-on state, the first transistor TR1 may be turned on during the logical high-level period of the voltage of the third node QF_C. Therefore, the compensation scan signal GC output through the first output node OC may be similar to a waveform of the voltage of the third node QF_C.

The second output circuit CO2 may include a second transistor TR2, a second capacitor C2, and a second pull-down transistor ETR2.

The second transistor TR2 may be connected between the first clock line CL1, to which the first clock signal CLK1 is supplied through the first clock terminal CIN1, and a second output node OW1. A gate electrode of the second transistor TR2 may be connected to the third node QF_C. An operation of the second transistor TR2 may be controlled in response to the voltage of the third node QF_C. When the second transistor TR2 is turned on, the first clock signal CLK1 having a first turn-on period TO1 may be transferred to the second output node OW1.

The second capacitor C2 may be connected between the gate electrode of the second transistor TR2 and the second output node OW1. The second capacitor C2 may boost up the voltage of the third node QF_C in response to a voltage of the second output node OW1. When the voltage of the third node QF_C is boosted up, the first clock signal CLK1 may be output to the first write scan line GWL_1 through the second output node OW1 without distortion. A signal output through the first write scan line GWL_1 may be the first write scan signal GW_1. Therefore, when a period during which the voltage of the third node QF_C is at a logical high level overlaps the first turn-on period TO1 of the first clock signal CLK1, the first write scan signal GW_1 may also be at a logical high level.

The second pull-down transistor ETR2 may be connected between the second power line LVL1 and the second transistor TR2. A gate electrode of the second pull-down transistor ETR2 may be connected to the second node QB. An operation of the second pull-down transistor ETR2 may be controlled in response to the voltage of the second node QB. When the second pull-down transistor ETR2 is turned on, the second voltage VGL1 may be transferred to the second output node OW1.

The third output circuit CO3 may include a third transistor TR3, a third capacitor C3, and a third pull-down transistor ETR3.

The third transistor TR3 may be connected between the second clock line CL2, to which the second clock signal CLK2 is supplied through the second clock terminal CIN2, and a third output node OW2. A gate electrode of the third transistor TR3 may be connected to the third node QF_C. An operation of the third transistor TR3 may be controlled in response to a voltage of the third node QF_C. When the third transistor TR3 is turned on, the second clock signal CLK2 having a second turn-on period TO2 may be transferred to the third output node OW2.

In an embodiment of the invention, each of the first transistor TR1, the second transistor TR2, the third transistor TR3, and the fourth transistor TR4 may be an N-type transistor. However, the transistors are not limited thereto, and each of the first transistor TR1, the second transistor TR2, the third transistor TR3, and the fourth transistor TR4 may be a P-type transistor in another embodiment.

The third capacitor C3 may be connected between the gate electrode of the third transistor TR3 and the third output node OW2. The third capacitor C3 may boost up the voltage of the third node QF_C in response to a voltage of the third output node OW2. When the voltage of the third node QF_C is boosted up, the second clock signal CLK2 may be output to the second write scan line GWL_2 through the third output node OW2 without distortion. A signal output through the second write scan line GWL_2 may be the second write scan signal GW_2. Therefore, when a period during which the voltage of the third node QF_C is at a logical high level overlaps the second turn-on period TO2 of the second clock signal CLK2, the second write scan signal GW_2 may also be at a logical high level.

The third pull-down transistor ETR3 may be connected between the second power line LVL1 and the third transistor TR3. A gate electrode of the third pull-down transistor ETR3 may be connected to the second node QB. An operation of the third pull-down transistor ETR3 may be controlled in response to the voltage of the second node QB. When the third pull-down transistor ETR3 is turned on, the second voltage VGL1 may be transferred to the third output node OW2.

In an embodiment of the invention, the compensation scan signal GC output from the first output circuit CO1 may have a first output turn-on period OTO1, the first write scan signal GW_1 output from the second output circuit CO2 may have a second output turn-on period OTO2, and the second write scan signal GW_2 output from the third output circuit CO3 may have a third output turn-on period OTO3. Here, the second output turn-on period OTO2 and the third output turn-on period OTO3 may each overlap the first output turn-on period OTO1. In other words, only while the compensation scan signal GC is output from the first output circuit CO1, the first write scan signal GW_1 may be output from the second output circuit CO2, and the second write scan signal GW_2 may be output from the third output circuit CO3.

In an embodiment of the invention, the operations of the first transistor TR1 in the first output circuit CO1, the second transistor TR2 in the second output circuit CO2, and the third transistor TR3 in the third output circuit CO3 may all be controlled in response to the voltage of the third node QF_C. Therefore, the first output circuit CO1, the second output circuit CO2, and the third output circuit CO3 may share the node control circuit NCC and the carry circuit CRC. Therefore, the circuit may be simplified due to the sharing of the node control circuit NCC and the carry circuit CRC of each output circuit, thereby reducing the power consumption of the electronic device ED (see FIG. 2), as the circuit is simplified, and the width of the dead space, that is, a width of the non-display area NDA (see FIG. 2) may be effectively reduced.

Figure 8:
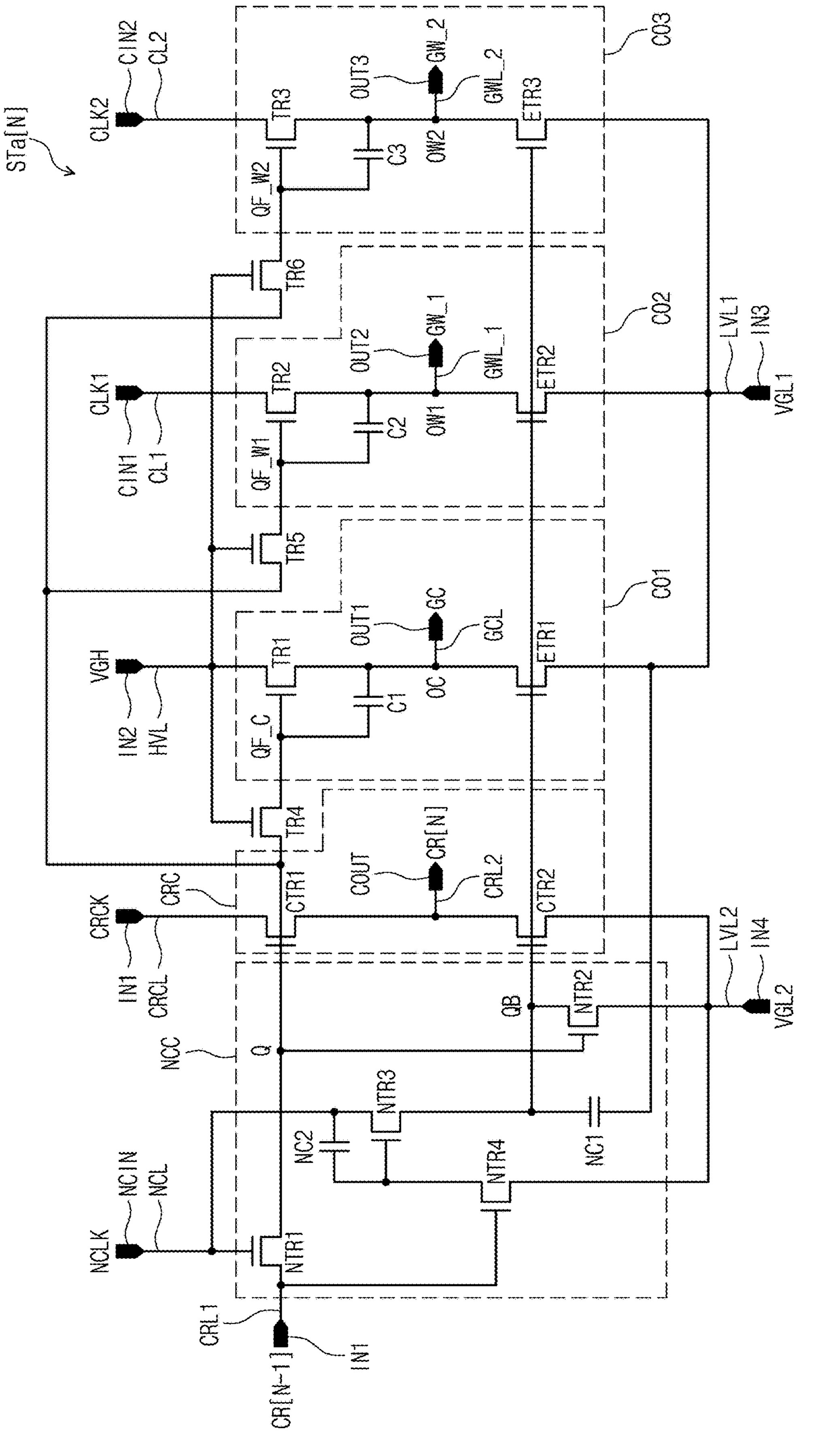
FIG. 8 is an equivalent circuit diagram of one stage according to another embodiment of the invention.
Figure 9:
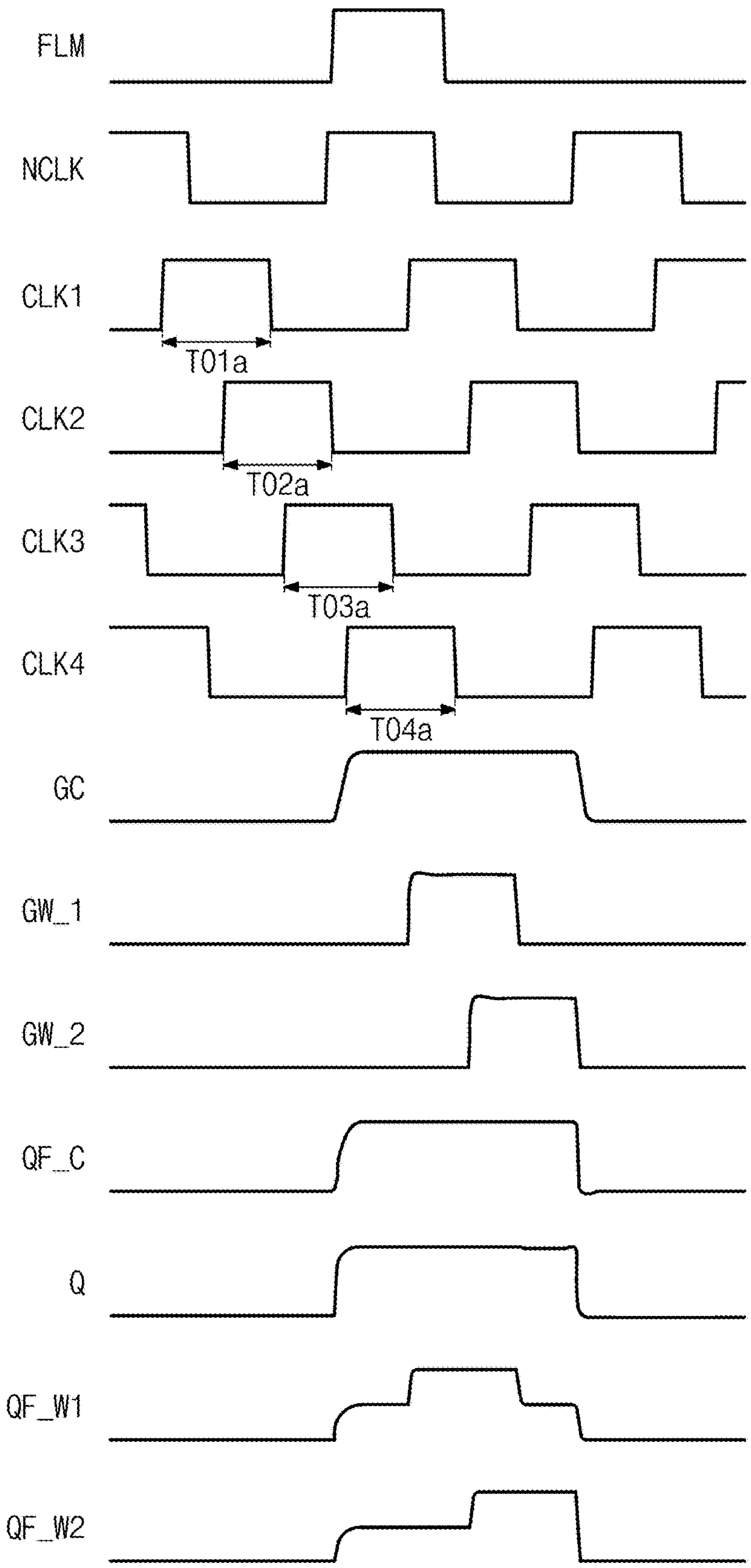
FIG. 9 is a timing diagram of signals input to or output from the one stage according to an embodiment of the invention.

FIG. 8 is an equivalent circuit diagram of one stage STa[N] according to another embodiment of the invention. FIG. 9 is a timing diagram of signals input to or output from the one stage STa[N] according to an embodiment of the invention.

In FIG. 8, the same reference numerals are used for the same components as those shown in FIG. 6, and descriptions thereof will be omitted. In FIG. 9, the same reference numerals are used for the same components as those shown in FIG. 7, and descriptions thereof will be omitted. FIGS. 5, 8, and 9 are views that provide a detailed explanation of the first scan stage ST1 described in FIG. 3.

Referring to FIGS. 8 and 9, the stage STa[N] may further include a first split node QF_W1, a second split node QF_W2, a fifth transistor TR5, and a sixth transistor TR6.

In an embodiment of the invention, the fifth transistor TR5 may be connected between the first node Q and the first split node QF_W1. A gate electrode of the fifth transistor TR5 may be connected to a first power line HVL. The fifth transistor TR5 may remain in a turn-on state in response to a first voltage VGH. When the fifth transistor TR5 is turned on, the voltage of the first node Q may be transferred to the first partition node QF_W1. Therefore, when a period during which the voltage of the first partition node QF_W1 is at a logical high level overlaps a first turn-on period TO1*a* of a first clock signal CLK1, a first write scan signal GW_1 may also be at a logical high level.

A gate electrode of a second transistor TR2 may be connected to the first partition node QF_W1. An operation of the second transistor TR2 may be controlled in response to a voltage of the first partition node QF_W1. A second capacitor C2 may be connected between the gate electrode of the second transistor TR2 and a second output node OW1. The second capacitor C2 may boost up the voltage of the first partition node QF_W1 in response to a voltage of the second output node OW1. When the voltage of the first partition node QF_W1 is boosted up, a first clock signal CLK1 may be output to a first write scan line GWL_1 through the second output node OW1 without distortion.

In an embodiment of the invention, the sixth transistor TR6 may be connected between the first node Q and the second partition node QF_W2. A gate electrode of the sixth transistor TR6 may be connected to the first power line HVL. The sixth transistor TR6 may remain in a turn-on state in response to the first voltage VGH. When the sixth transistor TR6 is turned on, the voltage of the first node Q may be transferred to the second partition node QF_W2. Therefore, when a period during which the voltage of the second partition node QF_W2 is at a logical high level overlaps a second turn-on period TO2*a* of the second clock signal CLK2, a second write scan signal GW_2 may also be at a logical high level.

A gate electrode of a third transistor TR3 may be connected to the second partition node QF_W2. An operation of the third transistor TR3 may be controlled in response to a voltage of the second partition node QF_W2. A third capacitor C3 may be connected between the gate electrode of the third transistor TR3 and a third output node OW2. The third capacitor C3 may boost up the voltage of the second partition node QF_W2 in response to a voltage of the third output node OW2. When the voltage of the second partition node QF_W2 is boosted up, a second clock signal CLK2 may be output to a second write scan line GWL_2 through the third output node OW2 without distortion.

In an embodiment of the invention shown in FIG. 6, the operations of the first transistor TR1, the second transistor TR2, and the third transistor TR3 are all controlled by the voltage of the third node QF_C. However, the stage STa[N] shown in FIG. 8 may separate the gate electrode of the second transistor TR2 from the third node QF_C through the fifth transistor TR5, and may separate the gate electrode of the third transistor TR3 from the third node QF_C through the sixth transistor TR6. Therefore, the operation of the first transistor TR1 may be controlled by the voltage of the third node QF_C, the operation of the second transistor TR2 may be controlled by the voltage of the first partition node QF_W1, and the operation of the third transistor TR3 may be controlled by the voltage of the second partition node QF_W2.

In other words, according to an embodiment of the invention, the nodes which control the operations of the first to third transistors TR1, TR2, and TR3 may be separated. The capacitance boosted by each separated node may have a value smaller than that of the capacitance boosted by the integrated node. For example, the capacitance boosted by the integrated node may be the combined capacitance of the first to third capacitors C1, C2, and C3, and the capacitance boosted by each of the separated nodes may correspond to the capacitance of each of the first to third capacitors C1, C2, and C3. Therefore, this may be advantageous for voltage boosting. Additionally, since each separated node performs boosting, output delay may be effectively reduced compared to when the integrated node performs boosting.

Figure 10:
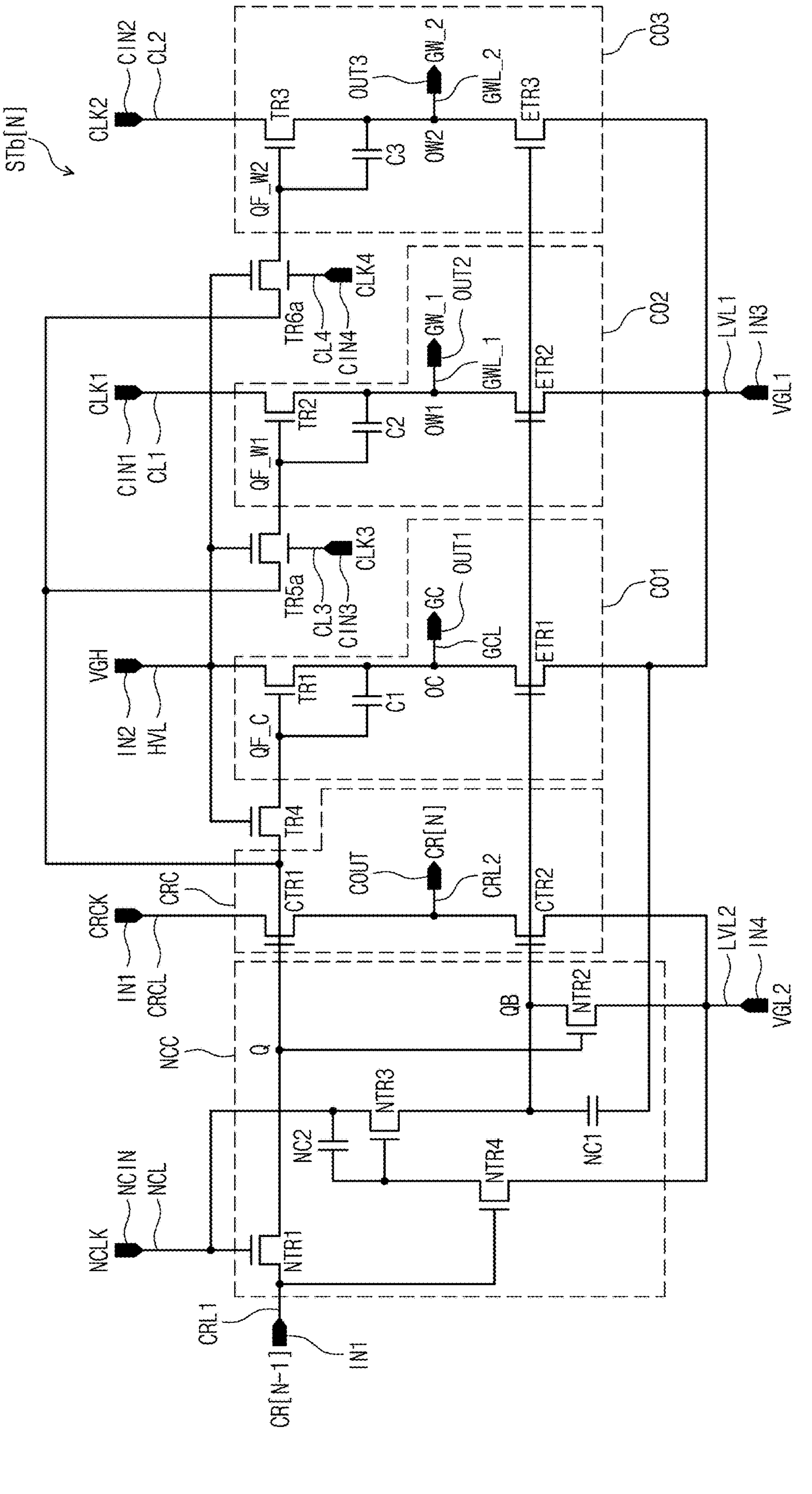
FIG. 10 is an equivalent circuit diagram of one stage according to still another embodiment of the invention.

FIG. 10 is an equivalent circuit diagram of one stage STb[N] according to still another embodiment of the invention. In FIG. 10, the same reference numerals are used for the same components as those shown in FIG. 8, and descriptions thereof will be omitted.

Referring to FIGS. 9 and 10, a fifth transistor TR5*a* and a sixth transistor TR6*a* each may further include a back gate electrode.

A back gate electrode of the fifth transistor TR5*a* may be connected to a third clock line CL3 to which a third clock signal CLK3 is supplied through a third clock terminal CIN3. A back gate electrode of the sixth transistor TR6*a* may be connected to a fourth clock line CL4 to which a fourth clock signal CLK4 is supplied through a fourth clock terminal CIN4. Here, the third clock signal CLK3 may have a third turn-on period TO3*a*, and the fourth clock signal CLK4 may have a fourth turn-on period TO4*a*.

In an embodiment of the invention, the turn-on periods of each of the first clock signal CLK1 transferred to the second output node OW1 through the second transistor TR2 and the third clock signal CLK3 transferred to the back gate electrode of the fifth transistor TR5*a*, i.e., the first turn-on period TO1*a* and the third turn-on period TO3*a*, may not overlap each other. Additionally, the first turn-on period TO1*a* and the third turn-on period To3*a* may differ from each other. For example, the first clock signal CLK1 and the third clock signal CLK3 may have a phase difference of 180 degrees. When the third clock signal CLK3 is transferred to the back gate electrode of the fifth transistor TR5*a*, a threshold voltage of the fifth transistor Tr5*a* may be shifted. For example, when the first clock signal CLK1 is at a logical high level, the third clock signal CLK3 will be at a logical low level, a base-source voltage of the fifth transistor TR5*a* may be negative, and the threshold voltage of the fifth transistor Tr5*a* may be positively shifted. When the base-source voltage of the fifth transistor TR5*a* is positive, the threshold voltage of the fifth transistor TR5*a* may be negatively shifted. As the threshold voltage of the fifth transistor TR5*a* shifts, voltage leakage of the first partition node QF_W1 may be controlled. The sixth transistor TR6*a* may also operate in the same manner as described for the fifth transistor TR5*a*.

Figure 11:
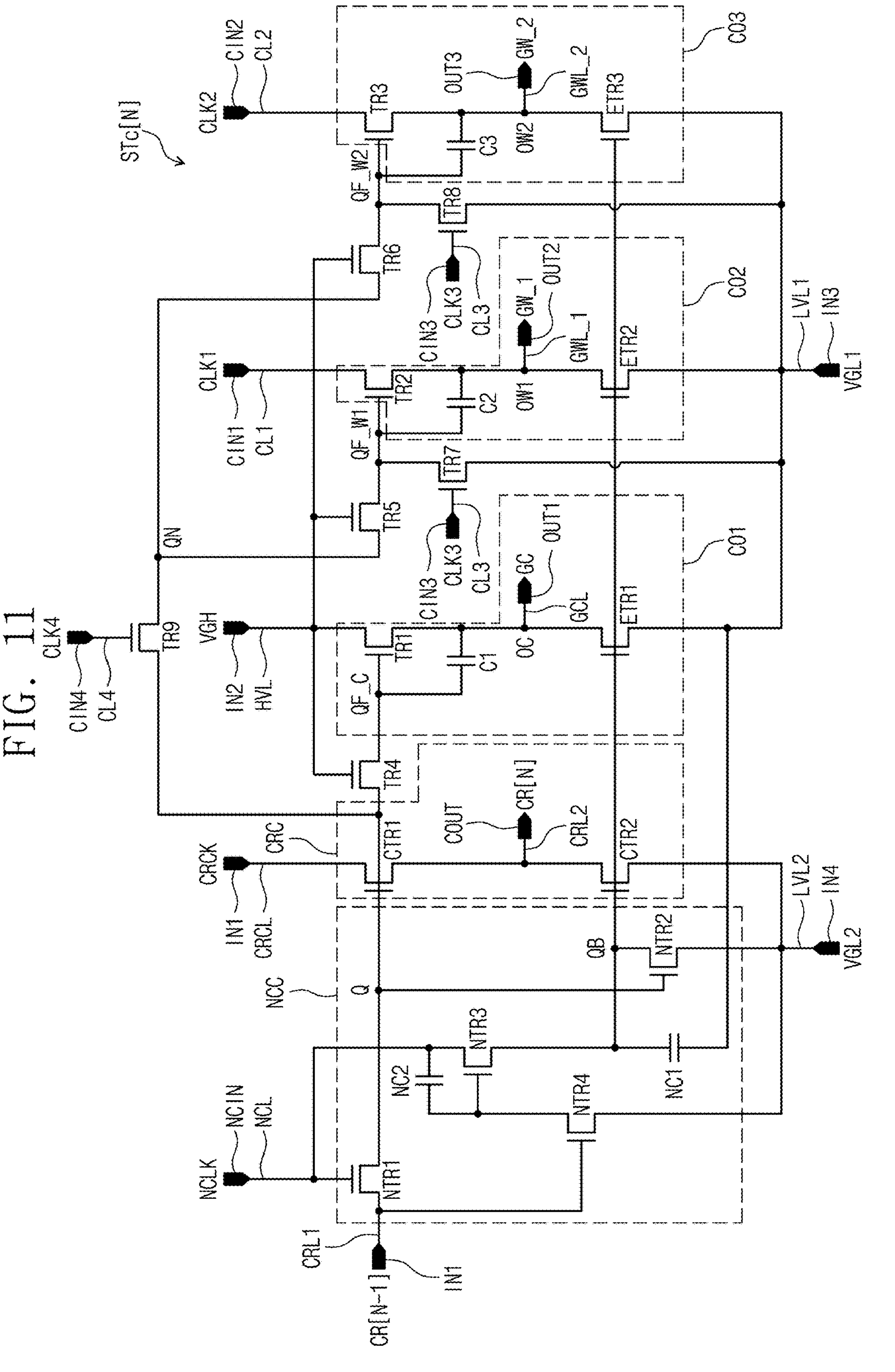
FIG. 11 is an equivalent circuit diagram of one stage according to yet another embodiment of the invention.

FIG. 11 is an equivalent circuit diagram of one stage STc[N] according to yet another embodiment of the invention. In FIG. 10, the same reference numerals are used for the same components as those shown in FIG. 8, and descriptions thereof will be omitted.

Referring to FIGS. 9 and 11, the stage STc[N] may further include a seventh transistor TR7, an eighth transistor TR8, and a ninth transistor TR9.

The seventh transistor TR7 may be connected between a first partition node QF_W1 and a second power line LVL1. A gate electrode of the seventh transistor TR7 may be connected to a third clock line CL3. An operation of the seventh transistor TR7 may be controlled in response to a third clock signal CLK3. When the seventh transistor TR7 is turned on, a second voltage VGL1 may be transferred to the first partition node QF_W1. The seventh transistor TR7 may be referred to as a first initializing transistor.

The eighth transistor TR8 may be connected between a second partition node QF_W2 and the second power line LVL1. A gate electrode of the eighth transistor TR8 may be connected to a third clock line CL3. An operation of the eighth transistor TR8 may be controlled in response to a third clock signal CLK3. When the eighth transistor TR8 is turned on, the second voltage VGL1 may be transferred to a second partition node QF_W2. The eighth transistor TR8 may be referred to as a second initializing transistor.

The ninth transistor TR9 may be connected between a first node Q and a fourth node QN. The fourth node QN may be a node in which one end of a fifth transistor TR5 and one end of a sixth transistor TR6 are connected. A gate electrode of the ninth transistor TR9 may be connected to a fourth clock line CL4. An operation of the ninth transistor TR9 may be controlled in response to a fourth clock signal CLK4. When the ninth transistor TR9 is turned on, a voltage of the first node Q may be transferred to one end of the fifth transistor TR5 and one end of the sixth transistor TR6.

In an embodiment of the invention, the ninth transistor TR9 may be referred to as a blocking transistor TR9 or a control transistor TR9. The ninth transistor TR9 may control output of a first write scan signal QW_1 and a second write scan signal QW_2. For example, when a width of the logical high level period of the voltage at the first node (Q) increases, the first write scan signal QW_1 and the second write scan signal QW_2 may be output through the fifth transistor TR5 and the sixth transistor TR6, which remain in a turn-on state, even when output is unnecessary. Since the operation of the ninth transistor TR9 is controlled by the fourth clock signal CLK4, the ninth transistor TR9 may be turned on only during a fourth turn-on period TO4*a*, allowing the output of the first write scan signal QW_1 and the second write scan signal QW_2 to be controlled even when the width of the logical high level period of the voltage at the 1st node Q increases.

In an embodiment of the invention, the seventh transistor TR7 and the eighth transistor TR8 connected to the first partition node QF_W1 and the second partition node QF_W2, respectively, may be referred to as a first initializing transistor TR7 and a second initializing transistor TR8. The seventh transistor TR7 and the eighth transistor TR8 may transfer the second voltage VGL1 to the first partition node QF_W1 and the second partition node QF_W2, respectively, to initialize a voltage of the first partition node QF_W1 and the second partition node QF_W2.

Although the present disclosure has been described with reference to the embodiments, it will be understood that various changes and modifications of the present disclosure may be made by one ordinary skilled in the art or one having ordinary knowledge in the art without departing from the spirit and technical field of the disclosure as hereinafter claimed. Hence, the technical scope of the invention shall be determined by the technical scope of the accompanying claims.

According to the above description, the electronic device may include the stage which includes the node control circuit, the carry circuit, the first output circuit, the second output circuit, and the third output circuit, and the first, second and third output circuits may share the node control circuit and the carry circuit. Therefore, the logic circuit section of one stage may be simplified, and as the circuit is simplified, the power consumption of the electronic device may be effectively reduced. Also, due to the simplification of the circuit, the dead space of the electronic device, that is, the width of the non-display area, may be effectively reduced.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. An electronic device comprising:

a plurality of pixels;

a plurality of scan lines electrically connected to the plurality of pixels; and a stage electrically connected to corresponding scan lines of the plurality of scan lines to receive a first clock signal and a second clock signal, wherein the stage comprises:

a node control circuit configured to control a voltage of a first node and a voltage of a second node;

a first output circuit comprising a first transistor, which is connected between a first power line to which a first voltage is provided and a first output node, and a first capacitor, which is connected between a gate electrode of the first transistor and the first output node;

a second output circuit comprising a second transistor, which is connected between a first clock line to which the first clock signal is provided and a second output node, and a second capacitor, which is connected between a gate electrode of the second transistor and the second output node;

a third output circuit comprising a third transistor, which is connected between a second clock line to which the second clock signal is provided and a third output node and a third capacitor, which is connected between a gate electrode of the third transistor and the third output node; and a fourth transistor connected between the first node and the gate electrode of the first transistor, and configured to be maintained in a turn-on state in response to the first voltage.

2. The electronic device of claim 1, wherein the first transistor, the second transistor, and the third transistor are controlled in response to a voltage of a third node.

3. The electronic device of claim 1, wherein the stage further comprises:

a fifth transistor, which is connected between the first node and the gate electrode of the second transistor; and a sixth transistor, which is connected between the first node and the gate electrode of the third transistor.

4. The electronic device of claim 3, wherein the fifth transistor and sixth transistor are maintained in a turn-on state in response to the first voltage.

5. The electronic device of claim 4, further comprising a third clock line to which a third clock signal is provided and a fourth clock line to which a fourth clock signal is provided, wherein the first clock signal has a first turn-on period, the second clock signal has a second turn-on period, the third clock signal has a third turn-on period, and the fourth clock signal has a fourth turn-on period, wherein the first turn-on period and the third turn-on period do not overlap each other, and the second turn-on period and the fourth turn-on period do not overlap each other.

6. The electronic device of claim 5, wherein each of the fifth transistor and the sixth transistor further comprises a back gate electrode, wherein the back gate electrode of the fifth transistor is connected to the third clock line, and wherein the back gate electrode of the sixth transistor is connected to the fourth clock line.

7. The electronic device of claim 5, wherein the stage further comprises:

a seventh transistor, which is connected between a second power line to which a second voltage having a lower level than the first voltage is provided and the gate electrode of the second transistor; and an eighth transistor, which is connected between the second power line and the gate electrode of the third transistor, wherein a gate electrode of the seventh transistor and a gate electrode of the eighth transistor are connected to the third clock line.

8. The electronic device of claim 7, wherein the stage further comprises a ninth transistor, which is connected between the first node and a fourth node, wherein one end of the fifth transistor and one end of the sixth transistor are connected to the fourth node, and a gate electrode of the ninth transistor is connected to the fourth click line.

9. The electronic device of claim 1, wherein the first output circuit outputs a first output signal having a first output turn-on period, the second output circuit outputs a second output signal having a second output turn-on period, and the third output circuit outputs a third output signal having a third output turn-on period, wherein each of the second output turn-on period and third output turn-on period overlaps the first output turn-on period.

10. The electronic device of claim 9, wherein the plurality of pixels comprise a first pixel and a second pixel spaced apart from the first pixel, wherein the first output signal is transferred to the first pixel and the second pixel, the second output signal is transferred to the first pixel, and the third output signal is transferred to the second pixel.

11. The electronic device of claim 1, wherein the first transistor, the second transistor, the third transistor, and the fourth transistor are an N-type transistor.

12. The electronic device of claim 1, further comprising a second power line to which a second voltage having a lower level than the first voltage is provided, wherein the first output circuit further comprises a first pull-down transistor, which is connected between the second power line and the first transistor, the second output circuit further comprises a second pull-down transistor, which is connected between the second power line and the second transistor, and the third output circuit further comprises a third pull-down transistor, which is connected between the second power line and the third transistor, wherein the first pull-down transistor, the second pull-down transistor, and the third pull-down transistor are controlled in response to the voltage of the second node.

13. The electronic device of claim 12, further comprising:

a third power line to which a third voltage having a lower level than each of the first voltage and second voltage is provided; and a carry clock line to which a carry clock signal is provided, wherein the stage further comprises a carry circuit comprising a first carry transistor and a second carry transistor, which are connected between the carry clock line to which the carry clock signal is provided and the third power line.

14. An electronic device comprising:

a first pixel;

a second pixel spaced apart from the first pixel;

a first write scan line electrically connected to the first pixel;

a second write scan line electrically connected to the second pixel;

a compensation scan line electrically connected to the first pixel and second pixel; and a stage configured to output a first write scan signal to the first write scan line, output a second write scan signal to the second write scan line, and output a compensation scan signal to the compensation scan line, wherein the stage comprises:

a first transistor, which is connected between a first power line to which a first voltage is provided and a first output node;

a second transistor, which is connected between a first clock line to which a first clock signal is provided and a second output node;

a third transistor, which is connected between a second clock line to which a second clock signal is provided and a third output node; and a fourth transistor connected between a first node and a gate electrode of the first transistor, and configured to be maintained in a turn-on state in response to the first voltage.

15. The electronic device of claim 14, further comprising a second power line to which a second voltage having a lower level than the first voltage is provided, wherein the stage further comprises:

a first pull-down transistor connected between the second power line and the first transistor, a second pull-down transistor connected between the second power line and the second transistor, and a third pull-down transistor connected between the second power line and the third transistor, wherein the first pull-down transistor, the second pull-down transistor, and the third pull-down transistor are controlled in response to a voltage of a second node.

16. The electronic device of claim 15, wherein the first transistor, the second transistor, and the third transistor are controlled in response to a voltage of a third node.

17. The electronic device of claim 14, wherein the stage further comprises:

a fifth transistor connected between the first node and a gate electrode of the second transistor; and a sixth transistor connected between the first node and a gate electrode of the third transistor, wherein the fifth transistor and the sixth transistor are maintained in a turn-on state in response to the first voltage.

18. The electronic device of claim 17, wherein each of the fifth transistor and the sixth transistor further comprises a back gate electrode, wherein the back gate electrode of the fifth transistor is connected to a third clock line, and the back gate electrode of the sixth transistor is connected to a fourth clock line.

19. The electronic device of claim 17, wherein the stage further comprises:

a first initializing transistor connected between a second power line to which a second voltage having a lower level than the first voltage is provided and the gate electrode of the second transistor; and a second initializing transistor connected between the second power line and the gate electrode of the third transistor, wherein a gate electrode of the first initializing transistor and a gate electrode of the second initializing transistor are connected to a third clock line.

20. The electronic device of claim 19, wherein the stage further comprises a blocking transistor connected between the first node and a fourth node, wherein one end of the fifth transistor and one end of the sixth transistor are connected to the fourth node, and a gate electrode of the blocking transistor is connected to a fourth clock line.

* * * * *